United States Patent [19]

Rumez et al.

[11] Patent Number: 5,561,238

[45] Date of Patent: Oct. 1, 1996

[54] METHOD FOR DETECTING AND EVALUATING PLANT EMISSIONS

[75] Inventors: Werner Rumez, Muehlacker; Siegfried Sumser, Stuttgart, both of Germany

[73] Assignee: Daimler-Benz Atkiengesellschaft, Germany

[21] Appl. No.: 258,636

[22] Filed: Jun. 10, 1994

[30] Foreign Application Priority Data

Jun. 10, 1993 [DE] Germany ................ 43 19 282.3

[51] Int. Cl.⁶ .................. G01M 15/00; F02D 35/00; F23N 5/24
[52] U.S. Cl. .................. 73/23.31; 340/439; 60/276; 123/703
[58] Field of Search ................ 73/23.31, 23.2, 73/31.03, 116; 340/438, 439, 441, 632, 633, 634; 60/276, 686; 123/672, 674, 677, 690, 703

[56] References Cited

U.S. PATENT DOCUMENTS

| | | | |
|---|---|---|---|
| 3,407,646 | 10/1968 | Traver | 73/23.31 |
| 3,846,076 | 11/1974 | Henault | 73/23.31 X |
| 3,998,095 | 12/1976 | Tinkham et al. | 73/23.31 X |
| 4,194,471 | 3/1980 | Baresel | 73/116 X |
| 4,520,652 | 6/1985 | Englund et al. | 73/863 X |
| 5,088,314 | 2/1992 | Takashi | 73/23.31 X |
| 5,252,949 | 10/1993 | Kirby et al. | 73/23.31 X |
| 5,367,470 | 11/1994 | Lang | 73/23.31 X |

FOREIGN PATENT DOCUMENTS

| | | |
|---|---|---|
| 0300260A1 | 1/1989 | European Pat. Off. . |
| 0463536A2 | 1/1992 | European Pat. Off. . |
| 3729770A1 | 3/1989 | Germany . |
| 3933830A1 | 4/1990 | Germany . |
| 4005803 | 8/1990 | Germany . |
| 4001970A1 | 7/1991 | Germany . |
| 63-140942 | 6/1988 | Japan . |

*Primary Examiner*—Michael Brock
*Attorney, Agent, or Firm*—Evenson, McKeown, Edwards & Lenahan, P.L.L.C.

[57] ABSTRACT

A method detects and evaluates emissions from plants, in particular from incineration or industrial plants. The absolute quantities of the pollutants are determined at preset intervals and an average over a preset measuring interval is formed therefrom. When a preset limiting average is exceeded, a check is made to determine whether this excess is due to a functional fault of the plant. If so, the plant is switched over to emergency running. If there is no functional fault, the running of the plant is restricted until the average falls again below the limiting average. The pollutant quantities determined are stored and can be utilized for determining levies.

10 Claims, 1 Drawing Sheet

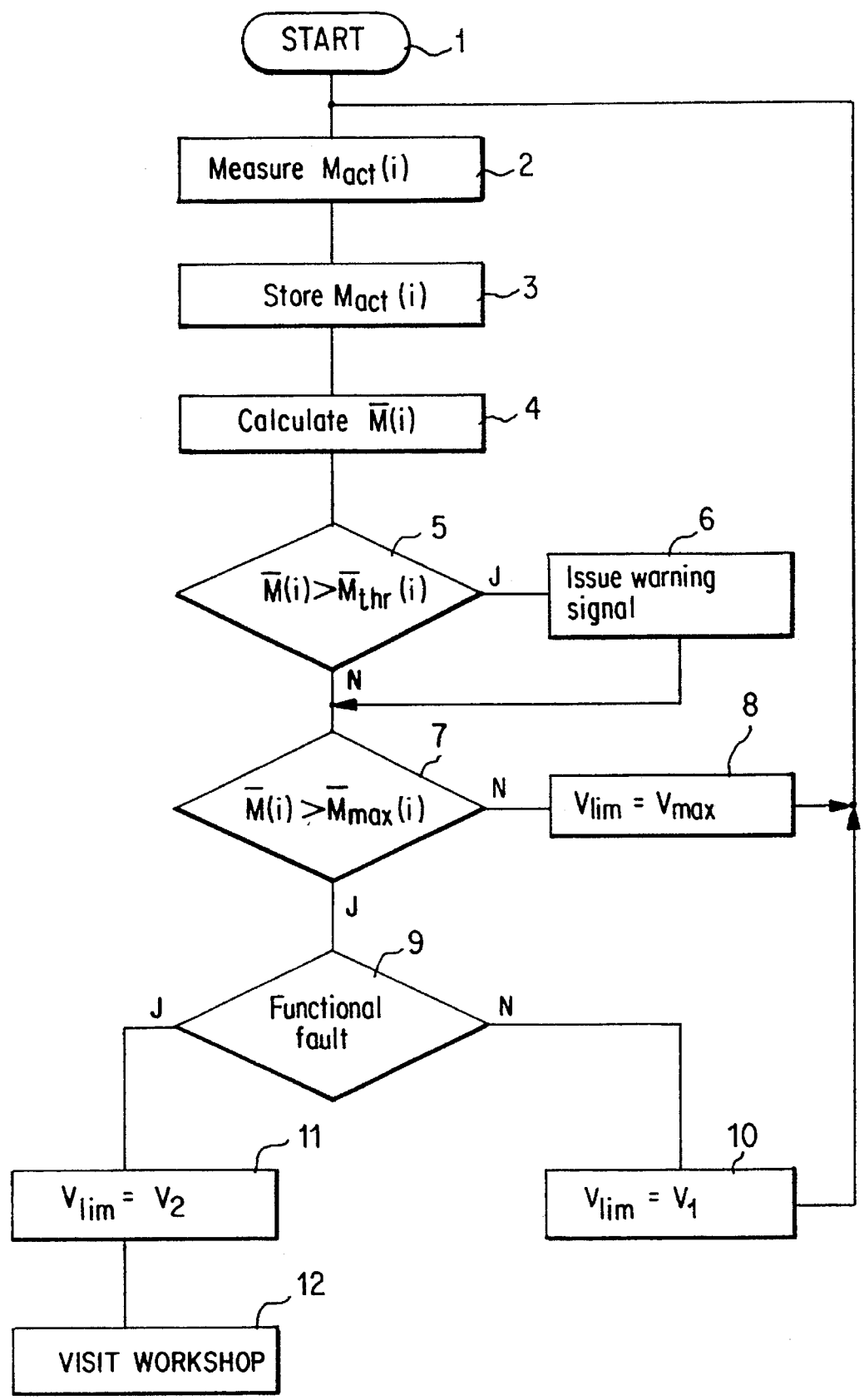

METHOD FOR DETECTING AND EVALUATING PLANT EMISSIONS

BACKGROUND AND SUMMARY OF THE INVENTION

The present invention relates to a method for detecting and evaluating the emissions from plants, in particular the exhaust gases and/or waste water from incineration or industrial plants, in which the emissions are analyzed, and the absolute quantities of the pollutants contained therein are determined and compared with limit values.

DE-OS 4,005,803 discloses a method in which the pollutant quantities contained in exhaust gas are selectively determined and indicated. The pollutant quantities are weighted according to load zones to be set by the driver and are stored for determining a tax or levies. Although the driver of a motor vehicle is thus financially penalized if he causes high pollutant quantities, this method cannot ensure adherence to defined limit values.

It is, therefore, an object of the present invention to provide a method which ensures adherence to preset limit values for the pollutant quantities generated, averaged over a preset measuring interval.

The foregoing object has been achieved in accordance with the present invention by a method in which the detected pollutant quantities are summed over the preset measuring interval to form limiting averages, and the pollutant values detected are compared with the preset limiting averages such that running of the plant is restricted when at least one of the pollutant averages exceeds a corresponding limiting average.

In connection with the $CO_2$ tax being discussed and with the further reduction of harmful exhaust gas constituents, a method is proposed for industrial and incineration plants, including motor vehicles with internal combustion engines, for detecting and evaluating the exhaust gases. In addition to the detection and storage of the exhaust gas values during the journey, the method of the present invention also makes it possible to enforce adherence to limit values for the various pollutants. For this purpose, a defined absolute quantity is allowed for each vehicle per preset measuring interval for the individual pollutant components of the exhaust gas. Limiting averages for the individual pollutant quantities are then calculated therefrom. In a comparison of the measured pollutant quantities with these limit averages, it can then be established whether the pollutant quantities exceed the limit values. If this is the case, the maximum vehicle speed is restricted to a preset limit value until the measured pollutant averages fall again below the limiting averages. The restriction of the running speed also restricts the quantity of the exhaust gas produced, so that it is really possible to enforce adherence to the limit values.

In one embodiment of the method of the present invention, the cause of exceeding the limit value can be determined from the operating parameters of the vehicle. In this embodiment, a distinction is made between exceeding the limit value due to the individual manner of driving and exceeding it due to a functional fault in a vehicle component. If a functional fault is present, for example a defect of the catalyst, the running speed is restricted to such an extent that the vehicle can then be driven only in emergency operations. This running speed restriction can be cancelled only after the functional fault has been remedied by authorized personnel. This forces the driver to visit a workshop as soon as possible if a functional fault occurs.

If a limit value is exceeded due to the individual driving manner of the driver, the latter is forced by the restriction of the running speed to produce less exhaust gases until the value falls again below the limit. This educational effect can also be enhanced by indicating both the actual pollutant values and the limit values to the driver. He is thereby in the position to avoid a restriction of the running speed by adapting his manner of driving in good time.

A further advantage of the method according to the present invention is that neither test cycles for determining the exhaust gas values nor exhaust gas investigations for detecting defective vehicle components are necessary. By detecting and storing the absolute pollutant quantities, the exhaust gas values can be detected in real operation and then read out and evaluated. The exhaust gas investigation is obviated because, if there is a functional fault, the driver is forced, by switching over to emergency operation, to remedy the fault immediately. In addition, the stored pollutant values can be utilized for determining taxes or levies directly and in a manner related to the pollutant quantity.

The provision of a facility for interrupting the method may be necessary in order to avoid dangerous situations. For example, an interruption of the method can become necessary if the running speed is restricted during an overtaking manoeuvre. To restrict misuse of this facility, it would be possible in this case separately to detect the pollutant quantity arising and impose a much higher levy. In addition, a time limit for the interruption of the method can be provided.

The facility for analyzing the quality of the surrounding air at defined time intervals and for presetting the limit values and distances travelled as a function of the quality of the surrounding air has the advantage that the pollutant output is more severely restricted in a more heavily polluted environment, for example in conurbations, than in less polluted areas.

Besides the evaluation of exhaust gases from any incineration plants, the present invention is also suitable for the evaluation of waste water from industrial plants.

BRIEF DESCRIPTION OF THE DRAWING

These and other objects, features and advantages of the method according to the present invention will become more readily apparent from the following detailed description thereof when taken in conjunction with the accompanying sole figure which is a flow chart for use of the method for a motor vehicle with internal combustion engine.

DETAILED DESCRIPTION OF THE DRAWING

After the start of the method (block 1), the exhaust gas is analyzed (block 2) and the pollutant quantities $M_{act}(i)$ contained therein are detected selectively and then stored (block 3). From the stored pollutant quantities $M_{act}(i)$, the pollutant averages $\overline{M}_{act}(i)$ over a preset distance s travelled are then calculated (block 4) and subsequently compared (block 5) with corresponding threshold values $\overline{M}_{thr}(i)$. If none of the pollutant averages $\overline{M}_{act}(i)$ exceeds the corresponding threshold value $\overline{M}_{thr}(i)$, the method jumps to the next step (block 7). By contrast, if one of the pollutant averages $\overline{M}_{act}(i)$ exceeds the corresponding threshold value $\overline{M}_{thr}(i)$, the method branches and a warning signal is issued to the driver (block 6). In either case, the method is then continued (block 7), where the pollutant averages $\overline{M}_{act}(i)$ are compared with corresponding limiting averages $\overline{M}_{max}(i)$. If none of the pollutant averages $\overline{M}_{act}(i)$ exceeds the corresponding limiting average $\overline{M}_{max}(i)$, the method branches such that, after a maximum speed $V_{lim}$ which has been preset for the vehicle is reduced or set back to the maximum value $V_{max}$ (block 8), the method jumps back to the starting point (block 2).

By contrast, if at least one of the pollutant averages $\overline{M}_{act}(i)$ exceeds the corresponding limiting average $\overline{M}_{max}(i)$ (block 7), a check is made as to whether the limiting value has been exceeded because of a functional fault of the internal combustion engine or of another vehicle component (block 9). If no functional fault is detected here, it can be assumed that the cause for exceeding the limit value was the individual driving habits of the vehicle driver. In that case, the method jumps to a step (block 10), where the maximum vehicle speed $V_{lim}$ is restricted to a first value $V_1$ and the method is then continued back at the starting point (block 2).

If, however, a functional fault is detected (block 9), the method jumps to another step (block 11), where the maximum vehicle speed $V_{lim}$ is restricted to a second value $V_2$. This speed limitation $V_2$ remains in force until the functional fault is remedied in a workshop. It is only during this workshop visit 12 that the method can be reset after the repair by authorized specialist personnel and restarted (block 1). The speed restriction $V_2$ is appropriately selected such that only emergency running of the vehicle is then possible. By way of the restricted running properties, the driver is motivated, on one hand, immediately to visit the workshop. On the other hand, the running properties are restricted only to such an extent that it is still possible to reach the workshop under the vehicle's "own steam".

The detection of the individual pollutant quantities $M_{act}(i)$ takes place in an analyzer suitable for this purpose and preferably fed by a defined exhaust gas part stream, for example via a tapping valve. The analysis can be carried out at preset time intervals or after preset distances travelled or at engine operating points which are preset as a function of a characteristic field. However, permanent exhaust gas tapping is equally within the scope of the present invention in which case, the exhaust gas is examined selectively for individual pollutant components i, for example NOx, CO, HC or soot particles. For each pollutant component i, a separate limiting average $\overline{M}_{max}(i)$ is preset. Exceeding of the permissible limiting averages $\overline{M}_{max}(i)$ can be detected (block 7) whenever one or more of the limiting averages $\overline{M}_{max}(i)$, or certain combinations of limiting averages $\overline{M}_{max}(i)$, are exceeded.

To assess the pollutant output, the pollutant components i are averaged over a preset distance s travelled. In this way, fluctuations caused by the surroundings or depending on individual driving situations are compensated. Moreover, by anticipated driving habits, the vehicle driver can, under normal traffic conditions, reduce his or her exhaust gas values to such an extent that, in brief extreme situations, for example during an overtaking manoeuvre or a hill climb, the limiting values are not immediately exceeded. If the limiting average $\overline{M}_{max}(i)$ is nevertheless exceeded, the pollutant output is restricted by restricting the maximum speed $V_{lim}$, and adherence to the limiting averages $\overline{M}_{max}(i)$ is thus enforced. If the vehicle driver does not adapt driving habits in spite of the limiting average $\overline{M}_{max}(i)$ being exceeded, the driver's driving properties are restricted for a longer period. If, however, the pollutant output is reduced by an adapted manner of driving, the speed restriction $V_{lim}$ is lifted again relatively soon. The speed limitation can in this case be effected, for example, via a speed of rotation limit or a load limit. This system also makes the purchase of low-polluting vehicles more attractive, whereas a more severe restriction of the freedoms of the individual manner of driving must be expected in vehicles having an increased pollutant output.

The threshold values $\overline{M}_{thr}(i)$ serve to warn the driver before the limiting averages $\overline{M}_{max}(i)$ are reached. For this purpose, the threshold values $\overline{M}_{thr}(i)$ are always selected to be smaller than the corresponding limiting averages $\overline{M}_{max}(i)$. The threshold values $\overline{M}_{thr}(i)$ thus form a kind of tolerance band below the limiting averages $\overline{M}_{max}(i)$. Within the tolerance band, the driver is prewarned by an optical and/or acoustic warning signal. The running speed is restricted only if the pollutant averages ($\overline{M}_{act}(i)$) rise further in spite of the warning. If the pollutant averages ($\overline{M}_{act}(i)$) fall again after the limit values $\overline{M}_{max}(i)$ have been exceeded, the warning signals remain activated until the values also fall below the threshold values $\overline{M}_{thr}(i)$ and a restriction of the running speed thus no longer has to be expected. It is also within the scope of the present invention, however, to reset the restriction of the running speed only when the pollutant averages $\overline{M}_{act}(i)$ not only fall below the limiting averages $\overline{M}_{max}(i)$, but have also fallen again below the threshold values $\overline{M}_{thr}(i)$.

The freedom which the vehicle driver is allowed is dependent on the preset distance s travelled. In the case of forming an average over a short distance s travelled, only slight fluctuations in the pollutant output can be compensated. In the case of an average being formed over long distances s travelled, the vehicle driver can save pollutant quantities which can then be used during subsequent journeys. It is then appropriate to indicate to the driver the current pollutant quantities $M_{act}(i)$ and the respective limiting averages $\overline{M}_{max}(i)$.

In addition to a fixed preset, the limiting averages $\overline{M}_{max}(i)$, the threshold values $\overline{M}_{thr}(i)$, the distance s travelled or the weighting factor can also be adapted to local conditions for an automatic charging of levies. For this purpose, the analyzer can be used at certain intervals for determining the quality of the surrounding air. The presets can then be varied depending on these measured values. In this way, the permissible pollutant output in particularly polluted areas, for example in conurbations, can be restricted more extensively. Furthermore, the topography can also be taken into account in the presets. Thus, for example, in a hilly area, higher limit values than in the plains can be permitted. The loading or the number of passengers in the vehicle can also be taken into account in this way. In this connection, it would be appropriate to take account of the previous history of the exhaust gas generation, for example a drive in a traffic jam, when determining the presets. For this purpose, the preset values are calculated via a functional relationship between the operating states in which the vehicle was involved during the preset distance travelled, and the preset values. This can be accomplished, for example, such that the characteristic field areas which are passed through during a measuring interval are marked and then contribute with different weighting in the determination of the preset values.

To prevent misuse of such devices, a cheating protection can additionally be provided. For this purpose, the probable exhaust gas quantity can, for example, be determined from operating parameters ad compared with the exhaust gas quantities arriving in the analyzer. If a fault is detected, the system immediately changes over to emergency operation, so that the driver is forced to visit the workshop and to have the fault remedied.

In addition to a restriction of the maximum speed $V_{lim}$ if a limiting average $\overline{M}_{max}(i)$ is exceeded, it is of course also possible to exert an educational effect on the vehicle driver by other interventions into the engine control.

The present invention is, of course, not restricted to the specific embodiment described above. It can be used analogously also for exhaust gases from industrial or private incineration plants, as well as for monitoring the waste water from industrial plants or from private households. If this is so, action is taken not on the maximum permissible speed but on other operating parameters which adversely affect the pollutant discharge of the corresponding plant. In this case, instead of the distance travelled, the quantity of exhaust gas or waste water can be preset as the measuring interval. Moreover, the method can be interrupted if, for example, the running speed is interrupted during a particular maneuver, and pollutant quantities $((M_{int}(i))$ arising during the interruption are detected and evaluated separately for providing in the example a higher levy.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for detecting and evaluating emissions from a plant, comprising the steps of (a) analyzing a composition of the emissions, (b) determining absolute quantities of individual pollutants, (c) presetting limiting averages per a preset measuring interval for individual pollutants, (d) summing the detected pollutant quantities over the preset measuring interval to form actual limiting averages to eliminate fluctuations caused during relatively long periods of plant operation, (e) comparing the actual limiting values with the preset limiting averages, and (f) using an open-loop control to restrict normal running of the plant as a result of at least one of the actual limiting averages exceeding a corresponding preset limiting average after operating the plant for a time period sufficiently long prior to the restricted running to permit control of the emissions.

2. The method according to claim 1, further comprising the step of determining, by reference to operating parameters of the plant, whether the actual limiting average is exceeded due to a functional fault of the plant.

3. The method according to claim 2, wherein, in the event of the functional fault, the plant is switched to a state of emergency running which can be changed only after authorized inspection.

4. The method according to claim 2, wherein, when the preset limiting average is exceeded without the occurrence of the functional fault, the running of the plant is restricted until the actual limiting average determined falls again below the present limiting average.

5. The method according to claim 1, wherein the pollutant actual limiting averages and the preset limiting averages are visually indicated.

6. The method according to claim 1, wherein the pollutant actual limiting averages are compared with corresponding threshold values which are smaller than the preset limiting averages, and that a warning signal is issued when the corresponding threshold value is exceeded.

7. The method according to claim 1, wherein the determined pollutant quantities are stored and can be read out for a tax levying function.

8. The method according to claim 1, wherein the steps of analyzing and determining the pollutant quantities occur during interruption of steps (c) through (f).

9. The method according to claim 1, wherein the quality of the surrounding air is analyzed at preset times, and the preset limiting averages are preset as a function of the surrounding air quality.

10. The method according to claim 9, wherein the measuring interval is preset as a function of the surrounding air quality.

* * * * *